United States Patent
Ke et al.

(10) Patent No.: US 11,566,156 B2
(45) Date of Patent: Jan. 31, 2023

(54) DRILLING FLUID LUBRICANT AND PREPARATION METHOD AND USE THEREOF

(71) Applicant: CHINA UNIVERSITY OF PETROLEUM-BEIJING, Beijing (CN)

(72) Inventors: Yangchuan Ke, Beijing (CN); Chengcheng Yu, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 246 days.

(21) Appl. No.: 17/080,173

(22) Filed: Oct. 26, 2020

(65) Prior Publication Data
US 2021/0054254 A1    Feb. 25, 2021

Related U.S. Application Data
(63) Continuation of application No. PCT/CN2018/088001, filed on May 23, 2018.

(30) Foreign Application Priority Data
Apr. 27, 2018  (CN) .......................... 201810390855.8

(51) Int. Cl.
C09K 8/035    (2006.01)
C09K 8/03     (2006.01)

(52) U.S. Cl.
CPC .............. *C09K 8/035* (2013.01); *C09K 8/032* (2013.01); *C09K 2208/02* (2013.01); *C09K 2208/10* (2013.01); *C09K 2208/34* (2013.01)

(58) Field of Classification Search
CPC ............ C09K 2208/02; C09K 2208/10; C09K 2208/34; C09K 8/032; C09K 8/035; C09K 8/04
See application file for complete search history.

(56) References Cited

U.S. PATENT DOCUMENTS 8,324,136 B1    12/2012  Ruark
2009/0305044 A1*  12/2009  Bicerano ............... C09K 8/725
                                                       428/407

FOREIGN PATENT DOCUMENTS

CN        1092453 A      9/1994
CN      101705079 A      5/2010
(Continued)

OTHER PUBLICATIONS

English translation of CN 10409509A printed Dec. 2, 2022 9 pages (Year: 2022).*

(Continued)

Primary Examiner — Alicia Bland
(74) Attorney, Agent, or Firm — J.C. Patents (57) ABSTRACT

The present disclosure provides a drilling fluid lubricant and a preparation method and use thereof. The preparation method includes steps of: 1) mixing styrene and water, then adding a nano-inorganic intermediate, a crosslinking agent and an emulsifier and stirring to obtain a first mixture; 2) under an inert atmosphere, stirring the first mixture to obtain an intermediate emulsion; then heating the intermediate emulsion to 70-85° C., then adding an initiator, keeping temperature and stirring for 7-10 hours to obtain an emulsion of polystyrene nanocomposite with a particle size of 40-90 nm; the emulsion of polystyrene nanocomposite being sequentially subjected to a granulating treatment to obtain polystyrene nanocomposite particles; 3) mixing industrial base oil, polystyrene nanocomposite particles and industrial oleic acid, and stirring evenly at room temperature to obtain the drilling fluid lubricant.

9 Claims, 3 Drawing Sheets

(56) References Cited

FOREIGN PATENT DOCUMENTS

| CN | 102863946 A | 1/2013 |
| CN | 103013462 A | 4/2013 |
| CN | 104109509 A | 10/2014 |

OTHER PUBLICATIONS

The first Office Action of the priority CN application 1 pages, dated Jan. 6, 2020.
The International Search Report 9 pages, dated May 23, 2018.
"Preparation and Characterization of the Organic Montmorillonite with Sodium Laurylsulfonate", Chinese Journal of Inorganic Chemistry, vol. 20, No. 3, Mar. 2004, pp. 251-255.
"The Preparation and Properties of Styrene Based Copolymers and Their Nanocomposites", Polymer Materials Science and Engineering, vol. 24, No. 6, Jun. 2008, pp. 18-21.

* cited by examiner

DRILLING FLUID LUBRICANT AND PREPARATION METHOD AND USE THEREOF

CROSS-REFERENCE TO RELATED APPLICATIONS

This application is a continuation of International Application No. PCT/CN2018/088001, filed on May 23, 2018, which claims priority to Chinese Patent Application No. 201810390855.8, filed on Apr. 27, 2018. The disclosures of the aforementioned applications are hereby incorporated by reference in their entireties.

TECHNICAL FIELD

The disclosure relates to a drilling fluid additive and, in particular, to a drilling fluid lubricant and a preparation method and a use thereof, which belongs to the technical field of oilfield drilling and completion engineering.

BACKGROUND

With the development of petroleum exploration and development, drilling depth is gradually increasing, and drilling resistance is increasing, which requires a drilling fluid used should have good lubrication and drag reduction characteristics to reduce resistance in the drilling process. Especially in directional drilling, when a wellbore has a large curvature and a drilling tool is launched, contact pressure, friction and frictional resistance between the drilling tool and a wall of the wellbore are greatly increased, and the wall of the wellbore is prone to form keyways, which lead to the happening of accidents such as breakage and jamming of the drilling tool, and even lead to borehole scrapping and engineering accidents in serious cases, causing huge safety risks and economic losses. Therefore, improving lubricating performance of the drilling fluid and reducing frictional resistance during the drilling process has become an urgent need for current oil drilling.

Drilling fluid is a working fluid for circularly washing in the wellbore during oil-gas drilling, which has the functions of washing a bottom of the wellbore, carrying cuttings, balancing formation pressure, cooling and lubricating a drill bit, stabilizing the wall of the wellbore, transmitting power, and obtaining formation information. Completion fluid refers to a working fluid used in a process of well-completion practice, which has the functions of inhibiting dispersion of oil-gas reservoir rock, balancing formation pressure, protecting reservoir permeability, and reducing reservoir damage. Adding a certain lubricant to the drilling fluid or the completion fluid is one of the main ways to improve economic and technical benefits of drilling or completion engineering at present.

Lubricant refers to a chemical treating agent that can reduce frictional resistance between the drilling tool and the wall of the wellbore, and is mainly a complex mixture of various basic materials and surfactants. Commonly used drilling fluid lubricants mainly include liquid lubricants and solid lubricants. The liquid lubricants mainly include polyalcohol lubricant, polyether lubricant, mineral oil lubricant or vegetable oil lubricant. The solid lubricants mainly include glass pellet, plastic pellet, graphite powder, and molybdenum disulfide. Among them, the solid lubricants are getting more and more attention due to their advantages of high load stability, corrosion resistance, and good chemical stability. Among the solid lubricants, the glass pellet due to poor pressure-bearing, high breakage rate, low ball rate, therefore limiting its application; the graphite powder and molybdenum disulfide are powdery and easy to float on a liquid surface, thus the use efficiency is low. In comparison, the plastic pellet, which has excellent characteristics of non-toxic, non-fluorescent, high pressure-bearing, and capable of significantly improving lubricity of drilling fluids, and so on, has attracted widespread attention, but its softening point is low, and easy to soften at a high temperature, the use temperature cannot exceed the softening point and other shortcomings limit its wide application. Therefore, in order to overcome such shortcomings, a plastic pellet drilling fluid lubricant with non-toxic, non-fluorescence, high pressure-bearing, good heat resistance and high softening point has been developed, which will play an important role in promoting oil drilling development.

The prior art (Wang Xijiang, Yu Peizhi, Liu Sihai, Development of solid emulsified lubricants, drilling fluids and completion fluids, 2010, 27 (2): 16-19) uses sodium bentonite and cationic-anionic surfactants to react, a powdered solid emulsified lubricant is synthesized by a gel method. When the addition amount of the lubricant is 0.5% and the addition amount of diesel fuel reaches 8%, the lubrication coefficient reduction rate is 66.9%, and the temperature resistance is 120° C.

The prior art (Zhao Jusu, Feng Guishuang, Wang Wanjie, Li Changsheng, Preparation and research of high-performance composite solid lubricants, Drilling Fluids and Completion Fluids, 2009, 26(4): 11-13) prepares polystyrene-graphite composite particles by an in-situ suspension polymerization method, where 99% of the pellets have a particle size distribution of 125 μm or more, the glass transition temperature is 120° C., the temperature resistance is only 150° C., and when the addition amount is 2%, the adhesion coefficient reduction rate is only 50%.

In addition, in view of friction factors in the drilling process, such as the friction between a drill string and the drilling fluid, the friction between the drill bit and the wall of the wellbore, the friction between the drilling fluid and a casing, etc., the lubrication and drag reduction mechanism in the prior art is mainly in forming a lubricating film layer between metal-metal or metal-rock through adsorption to reduce frictional resistance. However, the lubricating film layer is not firmly adsorbed, easy to desorb and easy to be scraped and wiped off, and even leads to accelerated wear and corrosion, which seriously affects efficiency of oil-gas drilling and completion engineering.

SUMMARY

In view of the above-mentioned defects, the present disclosure provides a drilling fluid lubricant and a preparation method and a use thereof, and the drilling fluid lubricant can effectively improve lubrication performance of a drilling fluid, reduce frictional resistance in the drilling process, and has good compatible with the drilling fluid and is easy to be uniformly dispersed in the drilling fluid, which solves the existing problems of poor temperature resistance, high foaming rate and poor lubrication effect of drilling fluid lubricants in the prior art.

The present disclosure provides a preparation method of a drilling fluid lubricant, including the following steps:

1) mixing styrene and water, then adding a nano-inorganic intermediate, a crosslinking agent and an emulsifier and stirring to obtain a first mixture;

where a mass ratio of the styrene to the water is 1:(4.5-6.5);

a mass ratio of the styrene, the nano-inorganic intermediate, the crosslinking agent and the emulsifier is 1:(0.01-0.1):(0.04-0.06):(0.018-0.032);

2) under an inert atmosphere, stirring the first mixture to obtain an intermediate emulsion; then heating the intermediate emulsion to 70-85° C., then adding an initiator, keeping temperature and stirring for 7-10 hours to obtain an emulsion of polystyrene nanocomposite with a particle size of 40-90 nm; a mass ratio of the styrene to the initiator is 1:(0.002-0.008);

the emulsion of polystyrene nanocomposite being sequentially subjected to a granulating treatment to obtain polystyrene nanocomposite particles;

3) mixing industrial base oil, polystyrene nanocomposite particles and industrial oleic acid, and stirring evenly at room temperature to obtain the drilling fluid lubricant;

where a mass ratio of the industrial base oil, the polystyrene nanocomposite particles and the industrial oleic acid is 1:(0.005-0.025):(0.04-0.09).

The polystyrene nanocomposite particles are prepared by the method of polymerizing styrene monomers and a nano-inorganic intermediate. The polystyrene nanocomposite particles have a particle size distribution of 40-90 nm, a small particle size, large specific surface area, and high surface energy, which are easily adsorbed on a metal surface of a drilling tool and a rock surface of the borehole wall when they exist between a mechanical drill string and a borehole wall. When the load is low, nano-lubricating particles adsorbed on two contact surfaces of the drilling tool and the rock will produce a "ball effect", which hinder direct contact between the two friction surfaces and change the static friction state between the two friction pairs into rolling friction state, thus greatly reducing friction coefficient. With the increase of load conditions, friction pressure and temperature continue to rise, and the nano-lubricating particles produce a "landfill effect" in recesses on the friction pairs to repair frictional damage parts on the surface of the friction pairs, at the same time, the nanoparticles are melted at a high temperature, and forms a layer of firm lubricating protective film on the surface of the friction pairs, and produces a "filming effect", which significantly decreases direct contact area between the two friction pairs, decreases rotary resistance of the drilling tool, reduces friction damage of the drilling tool, and reduces the probability of differential pressure sticking.

Specifically, in order to ensure uniformly mixing of the individual reactants in step 1), the mixture can be stirred at 30 Hz for 30 minutes to generate the uniformly mixed first mixture, and then the first mixture is transferred to a polymerization vessel for polymerization reaction of step 2).

Since the polymerization of step 2) needs to be carried out under the protection of the inert atmosphere, an inert gas (e.g. nitrogen or argon) can first be introduced into the polymerization vessel for 20-30 minutes to remove oxygen therein, and nitrogen is generally used. In a specific operation, the nitrogen has a purity of 99.999%, a pressure of 0.5-0.55 MPa, and a flow rate of 40-50 m$^3$/h.

In addition, the granulating treatment in step 2) specifically refers to ethanol demulsification, filtration, drying, and granulation of the emulsion of polystyrene nanocomposite in sequence.

Further, the nano-inorganic intermediate is prepared according to the following steps:

a) mixing layered silicate and the water to obtain a second mixture, adjusting pH of the second mixture to 1-2, then heating to 70-80° C. and stirring for 30-40 minutes to obtain an activated silicate intermediate;

a mass ratio of the layered silicate to the water is 1:(15-25);

b) adding an intercalation agent to the activated silicate intermediate, and stirring to react for 10-12 h at 30-35 Hz to obtain an intercalation reaction system; a mass ratio of the activated silicate intermediate to the intercalation agent is 1:(0.025-0.5);

c) subjecting the intercalation reaction system to filtration, washing, drying and grinding, to obtain the nano-inorganic intermediate.

where in the step a), one or more of hydrochloric acid, sulfuric acid and nitric acid is used to adjust the pH of the second mixture to 1-2.

The nano-inorganic intermediate of the present disclosure is obtained by pretreating the layered silicate with an inorganic acid solution, and then adding an anionic surfactant for its intercalation reaction. In a specific embodiment of the present disclosure, pretreatment of the layered silicate with inorganic acid solution can improve chemical microenvironment between silicate sheets, increase reactive sites on a surface of the silicate, and create a good intercalation modification conditions of the anionic surfactant, enhance intercalation effect of the anionic surfactant, thereby enhancing peeling and dispersion ability of a nano-inorganic phase. A study found that an interlamellar spacing of the layered silicate intercalation sheets obtained by the method of the present disclosure can reach 1.5-3.0 nm, and the in-situ emulsion polymerization reaction between the nano-inorganic intermediate and the styrene monomer can effectively prevent styrene polymerization on the one hand, so as to obtain the polystyrene nanocomposite particles with a smaller particle size distribution (40-90 nm), thereby enhancing lubricating effect, and on the other hand, the nano-inorganic intermediate can be uniformly peeled and dispersed in a polymer matrix, which solves the problem of easy agglomeration of nano-inorganic intermediates in the polymer matrix in the prior art.

Further, the intercalation agent is selected from one or more of sodium dodecyl sulfonate, sodium dodecyl sulfate, sodium dodecylbenzene sulfonate, sodium hexadecyl sulfonate, sodium octadecyl sulfonate, sodium stearate, sodium palmitate, and sodium laurate.

The intercalation agent selected in the present disclosure is the above-mentioned anionic surfactants, thus enabling the conversion of layered silicate into a lipophilic organic layered silicate, and the lipophilic organic layered silicate is a kind of surfactant, thus enabling further control of the particle size of the polystyrene nanocomposite particles.

Further, before the step 1), it further includes subjecting the styrene to a purification pretreatment, and the purification pretreatment includes: rinsing the styrene using a sodium hydroxide aqueous solution with a mass fraction of 8%, then adjusting pH of the styrene to 7, and distilling under a reduced pressure, and a distillate is the styrene that has been subjected to the purification pretreatment.

Since the styrene is prone to self-polymerization reaction, polymerization inhibitors such as hydroquinone are generally added to the styrene in order to prevent its self-polymerization from occurring. Therefore, before the preparation of the polystyrene nanocomposite particles of the present disclosure, the styrene needs to be subjected to the purification pretreatment to remove polymerization inhibitors therein.

The specific operations of the purification pretreatment are: mixing the sodium hydroxide aqueous solution having a mass fraction of 8% with the styrene for layering, and separating liquid and retaining an organic phase; then washing the organic layer with distilled water to neutral, separating the liquid to remove a water phase and retaining the organic phase; then performing vacuum distillation on the organic phase, and a distillate is purified styrene. It needs to be added that if the vacuum distillation is not carried out in time after washing to neutral, the organic phase that being washed to neutral can be stored in low-temperature anhydrous sodium sulfate.

Further, the industrial base oil is selected from one or more of industrial silicone oil, industrial white oil, industrial polyalphaolefin synthetic oil and industrial paraffin oil.

Further, the layered silicate is selected from one or more of montmorillonite, hydrotalcite, kaolin, attapulgite, sepiolite, wollastonite, chlorite and layered silicate.

Further, the crosslinking agent is selected from one or more of divinylbenzene, N,N-methylenebisacrylamide, diisocyanate and benzoyl peroxide.

Further, the emulsifier is selected from one or more of sodium dodecyl sulfonate, sodium dodecyl sulfate, and sodium dodecylbenzene sulfonate.

Further, the initiator is selected from one or more of ammonium persulfate, potassium persulfate, sodium bisulfate, sodium sulfite, azobisisobutyronitrile and benzoyl peroxide.

The present disclosure also provides a drilling fluid lubricant, which is obtained according to any one of the above preparation methods.

The present disclosure also provides a drilling fluid, which contains the aforementioned drilling fluid lubricant, wherein a mass fraction of the drilling fluid lubricant in the drilling fluid is 0.2-5%.

In the drilling fluid of the present disclosure, besides the drilling fluid lubricant, the rest can be common drilling fluid base slurry. In the preparation of the drilling fluid, it is only necessary to add the drilling fluid lubricant to the drilling fluid base slurry according to a required amount and stir evenly.

The drilling fluid containing the drilling fluid lubricant of the present disclosure has 200° C. high temperature aging stability, good compatibility with drilling fluids, low foaming rate, and can meet lubrication, drag reduction, and high-efficiency drilling of drilling tools in the drilling process.

The present disclosure also provides a use of the above-mentioned drilling fluid in deep-layer and ultra-deep-layer high-temperature drilling and completion engineering.

Specifically, in drilling engineering, "deep-layer" refers to a stratum with a buried depth of 4500~6000 m, and "ultra-deep-layer" refers to a stratum with a buried depth of more than 6000 m.

The drilling fluid lubricant of the present disclosure has a simple preparation method and low production cost, can effectively reduce resistance in the drilling process, has excellent lubricating effect. And it is easy to disperse in drilling fluid, has a low foaming rate, good temperature resistance and good compatibility with drilling fluid, so it can be widely used in deep-layer and ultra-deep-layer high-temperature drilling and completion engineering.

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

Example 1

A preparation method of a nano-inorganic intermediate in this example is as follows:

a) mixing layered silicate and water to obtain a second mixture, then adjusting the pH of the second mixture to pH=1 with 1 mol/L of hydrochloric acid solution, heating and stirring the second mixture to 75° C., keeping temperature and continuously stirring for 30-40 minutes to obtain an activated silicate intermediate;

where a mass ratio of the silicate to the water is 1:20;

b) adding a sodium hexadecyl sulfonate intercalation agent to the activated silicate intermediate, maintaining 75° C. and stirring at 30 Hz for 11 hours to obtain an intercalation reaction system;

where a mass ratio of the activated silicate intermediate to the sodium hexadecyl sulfonate intercalation agent is 1:0.1;

c) subjecting the intercalation reaction system to filtering, washing with deionized water several times, drying at 60° C. for 24 hours, grinding and passing through a 200-mesh sieve, to obtain the nano-inorganic intermediate.

Figure 1:
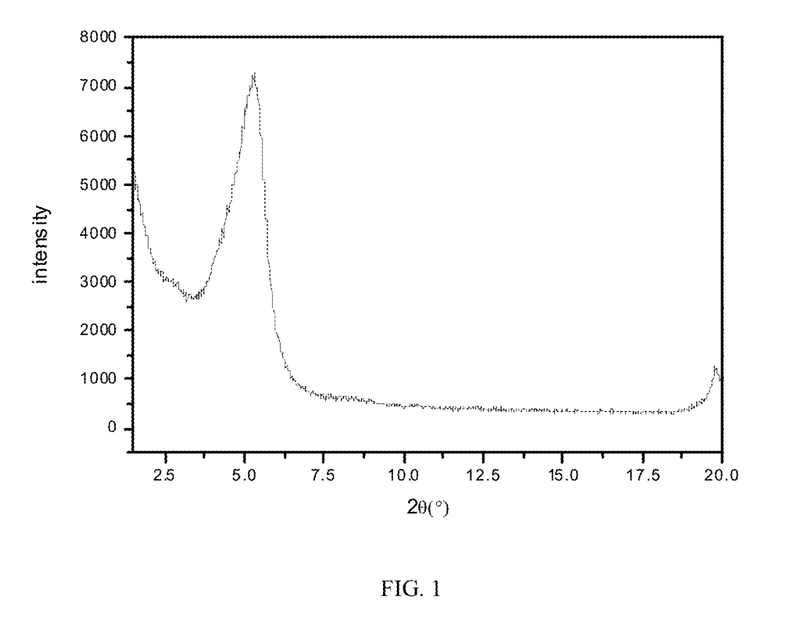
FIG. 1 is an X-ray diffraction diagram of a nano-inorganic intermediate prepared in Example 1 of the present disclosure.

FIG. 1 is an X-ray diffraction diagram of the nano-inorganic intermediate of Example 1 of the present disclosure.

Example 2

A preparation method of a nano-inorganic intermediate in this example is as follows:

a) mixing layered silicate and water to obtain a second mixture, then adjusting the pH of the second mixture to pH=1 with 1 mol/L of hydrochloric acid solution, heating and stirring the second mixture to 75° C., keeping temperature and continuously stirring for 30-40 minutes to obtain an activated silicate intermediate;

where a mass ratio of the silicate to the water is 1:20;

b) adding a sodium hexadecyl sulfonate intercalation agent to the activated silicate intermediate, maintaining 75° C. and stirring at 30 Hz for 11 hours to obtain an intercalation reaction system;

where a mass ratio of the activated silicate intermediate to the sodium hexadecyl sulfonate intercalation agent is 1:0.19;

c) subjecting the intercalation reaction system to filtering, washing with deionized water several times, drying at 60° C. for 24 hours, grinding and passing through a 200-mesh sieve, to obtain the nano-inorganic intermediate.

Figure 2:
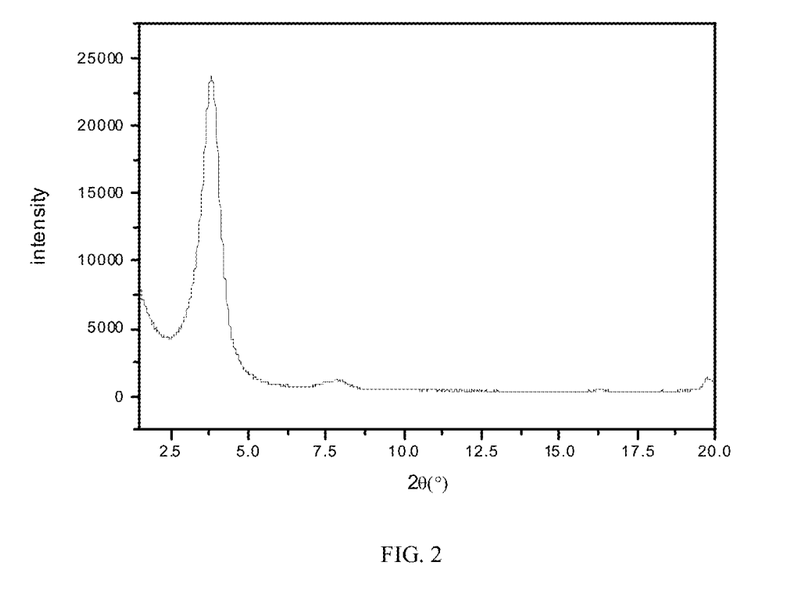
FIG. 2 is an X-ray diffraction diagram of a nano-inorganic intermediate prepared in Example 2 of the present disclosure.

FIG. 2 is an X-ray diffraction diagram of the nano-inorganic intermediate of Example 2 of the present disclosure.

Example 3

A preparation method of a nano-inorganic intermediate in this example is as follows:

a) mixing layered silicate and water to obtain a second mixture, then adjusting the pH of the second mixture to pH=1 with 1 mol/L of hydrochloric acid solution, heating and stirring the second mixture to 75° C., keeping temperature and continuously stirring for 30-40 minutes to obtain an activated silicate intermediate;

where a mass ratio of the silicate to the water is 1:20;

b) adding a sodium hexadecyl sulfonate intercalation agent to the activated silicate intermediate, maintaining 75° C. and stirring at 30 Hz for 11 hours to obtain an intercalation reaction system;

where a mass ratio of the activated silicate intermediate to the sodium hexadecyl sulfonate intercalation agent is 1:0.27;

c) subjecting the intercalation reaction system to filtering, washing with deionized water several times, drying at 60° C. for 24 hours, grinding and passing through a 200-mesh sieve, to obtain the nano-inorganic intermediate.

Figure 3:
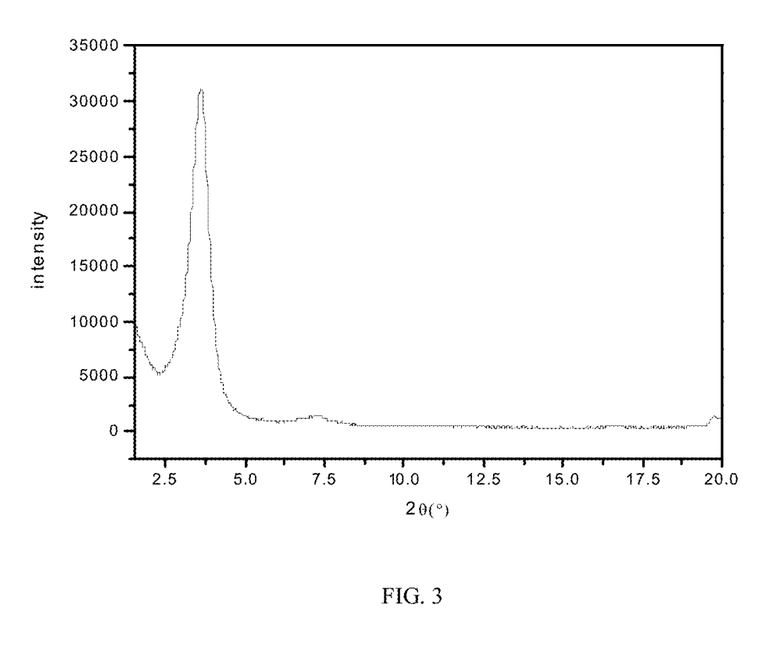
FIG. 3 is an X-ray diffraction diagram of a nano-inorganic intermediate prepared in Example 3 of the present disclosure.

FIG. 3 is an X-ray diffraction diagram of the nano-inorganic intermediate of Example 3 of the present disclosure.

Figure 4:
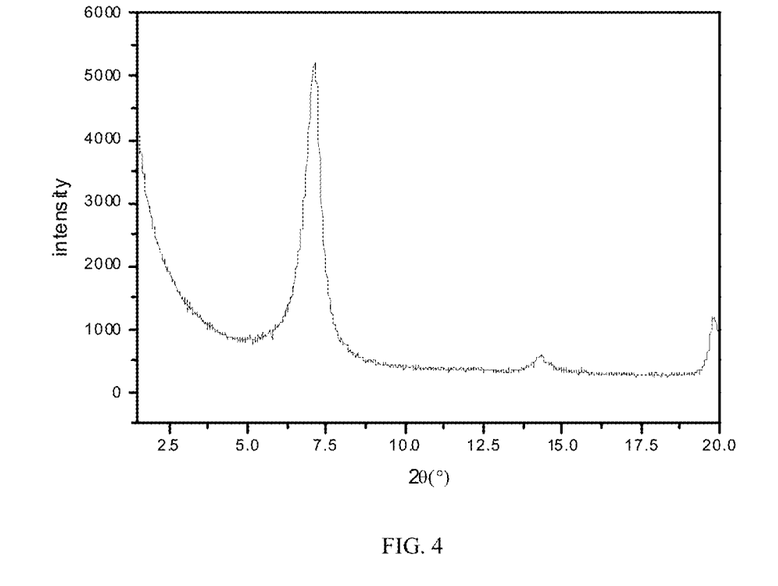
FIG. 4 is an X-ray diffraction diagram of an activated silicate intermediate in Examples 1-3 of the present disclosure.

FIG. 4 is an X-ray diffraction diagram of the activated silicate intermediate in Examples 1-3 of the present disclosure.

It can be seen from FIGS. 1 to 4 that the interlamellar spacing of the nano-inorganic intermediates prepared by the present disclosure is significantly improved compared to the 1.21 nm interlamellar spacing of the activated silicate, corresponding to the interlamellar spacing of the nano-inorganic intermediates in Examples 1-3, which are increased to 1.68 nm, 2.36 nm and 2.45 nm respectively, indicating that intercalation modification is successful.

Example 4

Before the preparation of drilling fluid lubricants, the styrene raw material is subjected to a purification pretreatment as follows to remove polymerization inhibitors in the styrene raw material: rinsing the styrene raw material with a 8% of NaOH solution to remove the polymerization inhibitors added therein, then rinsed with distilled water until a pH test paper shows neutral (pH=7), and distilling the styrene under a reduced pressure, the distillate is the purified styrene with a suitable polymerization purity.

The above-mentioned purified styrene is used to prepare drilling fluid lubricants for all the following examples.

A preparation method of the drilling fluid lubricant in this Example is as follows:

1) mixing styrene (after being subjected to the purification pretreatment) and water, then adding a nano-inorganic intermediate, a crosslinking agent and an emulsifier to obtain a first mixture;

where a mass ratio of the styrene to the water is 1:5; a mass ratio of the styrene, the nano-inorganic intermediate, the crosslinking agent and the emulsifier is 1:0.01:0.05:0.025;

2) under an inert atmosphere (nitrogen gas with a purity of 99.999%, a pressure of 0.5-0.55 MPa, and a flow rate of 40-50 m³/h is injected for 30 minutes), stirring the first mixture to obtain an intermediate emulsion; then heating the intermediate emulsion to 75° C., then adding an initiator, keeping temperature and stirring for 8 hours to obtain an emulsion of polystyrene nanocomposite with a particle size of 40-90 nm; a mass ratio of the styrene to the initiator is 1:0.005;

The emulsion of polystyrene nanocomposite is successively subjected to ethanol demulsification, filtering, drying at 60° C. for 24 hours, granulating, and passing through a 200-mesh sieve to obtain polystyrene nanocomposite particles;

3) mixing industrial polyalphaolefin synthetic oil, the polystyrene nanocomposite particles and industrial oleic acid, and stirring evenly at room temperature to obtain a drilling fluid lubricant;

where a mass ratio of the industrial polyalphaolefin synthetic oil, the polystyrene nanocomposite particles and the industrial oleic acid is 1:0.001:0.05.

Example 5

A preparation method of drilling fluid lubricant in this Example is as follows:

1) mixing styrene (after being subjected to the purification pretreatment) and water, then adding a nano-inorganic intermediate, a crosslinking agent and an emulsifier to obtain a first mixture;

where a mass ratio of the styrene to the water is 1:5; a mass ratio of the styrene, the nano-inorganic intermediate, the crosslinking agent and the emulsifier is 1:0.03:0.05:0.025;

2) under an inert atmosphere (nitrogen gas with a purity of 99.999%, a pressure of 0.5-0.55 MPa, and a flow rate of 40-50 m³/h is injected for 30 minutes), stirring the first mixture to obtain an intermediate emulsion; then heating the intermediate emulsion to 75° C., then adding an initiator, keeping temperature and stirring for 8 hours to obtain an emulsion of polystyrene nanocomposite with a particle size of 40-90 nm; a mass ratio of the styrene to the initiator is 1:0.005;

The emulsion of polystyrene nanocomposite is successively subjected to ethanol demulsification, filtering, drying at 60° C. for 24 hours, granulating, and passing through a 200-mesh sieve to obtain polystyrene nanocomposite particles;

3) mixing industrial polyalphaolefin synthetic oil, the polystyrene nanocomposite particles and industrial oleic acid, and stirring evenly at room temperature to obtain a drilling fluid lubricant;

where a mass ratio of the industrial polyalphaolefin synthetic oil, the polystyrene nanocomposite particles and the industrial oleic acid is 1:0.001:0.05.

Figure 5:
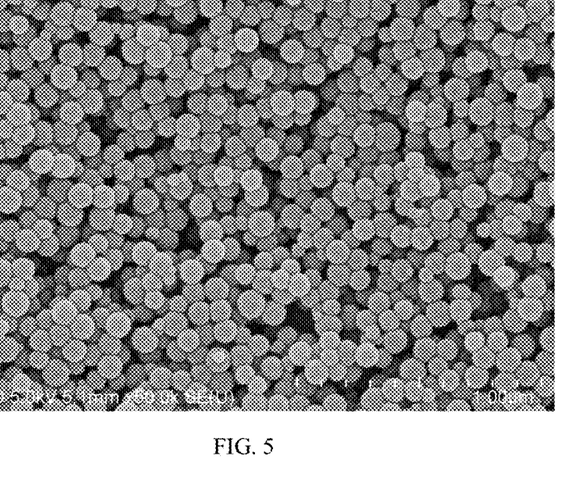
FIG. 5 is a scanning electron microscope diagram of polystyrene nanocomposite particles prepared in Example 5 of the present disclosure.
Figure 6:
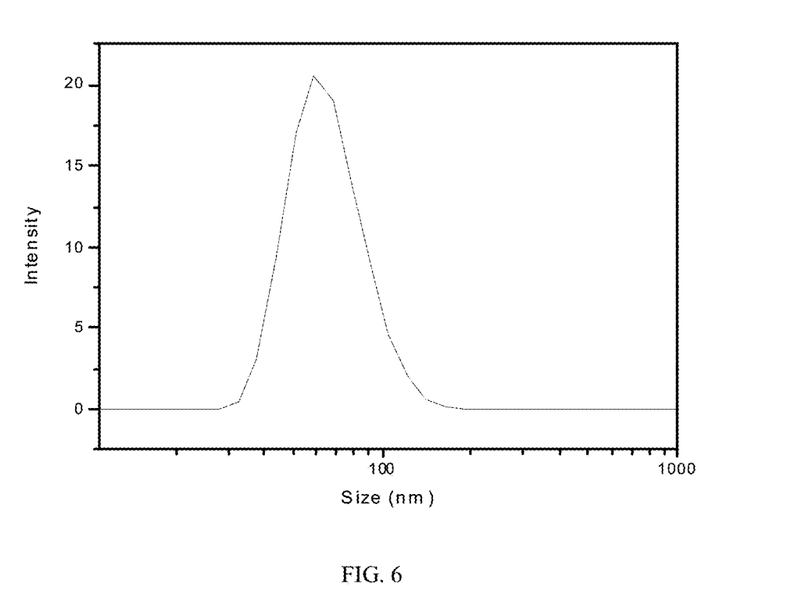
FIG. 6 is a particle size distribution diagram of the polystyrene nanocomposite particles prepared in Example 5 of the present disclosure.

FIG. 5 is a scanning electron microscope diagram of the polystyrene nanocomposite particles prepared in Example 5 of the present disclosure;

FIG. 6 is a particle size distribution diagram of the polystyrene nanocomposite particles prepared in Example 5 of the present disclosure.

It can be seen from FIGS. 5-6 that the particle size distribution of the polystyrene nanocomposite particles prepared by the present disclosure is mainly in the range of 40-90 nm, with an average particle size of 64.5 nm. The test results of FIG. 5 and FIG. 6 are similar, and the particles have a spherical structure, good sphericity, and a smooth surface.

Example 6

A preparation method of drilling fluid lubricant in this Example is as follows:

1) mixing styrene (after being subjected to the purification pretreatment) and water, then adding a nano-inorganic intermediate, a crosslinking agent and an emulsifier to obtain a first mixture;

where a mass ratio of the styrene to the water is 1:5; a mass ratio of the styrene, the nano-inorganic intermediate, the crosslinking agent and the emulsifier is 1:0.05:0.05:0.025;

2) under an inert atmosphere (nitrogen gas with a purity of 99.999%, a pressure of 0.5-0.55 MPa, and a flow rate of 40-50 m$^3$/h is injected for 30 minutes), stirring the first mixture to obtain an intermediate emulsion; then heating the intermediate emulsion to 75° C., then adding an initiator, keeping temperature and stirring for 8 hours to obtain an emulsion of polystyrene nanocomposite with a particle size of 40-90 nm; a mass ratio of the styrene to the initiator is 1:0.005;

The emulsion of polystyrene nanocomposite is successively subjected to ethanol demulsification, filtering, drying at 60° C. for 24 hours, granulating, and passing through a 200-mesh sieve to obtain polystyrene nanocomposite particles;

3) mixing industrial polyalphaolefin synthetic oil, the polystyrene nanocomposite particles and industrial oleic acid, and stirring evenly at room temperature to obtain a drilling fluid lubricant;

where a mass ratio of the industrial polyalphaolefin synthetic oil, the polystyrene nanocomposite particles and the industrial oleic acid is 1:0.001:0.05.

Example 7

A preparation method of drilling fluid lubricant in this Example is as follows:

1) mixing styrene (after being subjected to the purification pretreatment) and water, then adding a nano-inorganic intermediate, a crosslinking agent and an emulsifier to obtain a first mixture;

where a mass ratio of the styrene to the water is 1:5; a mass ratio of the styrene, the nano-inorganic intermediate, the crosslinking agent and the emulsifier is 1:0.07:0.05:0.025;

2) under an inert atmosphere (nitrogen gas with a purity of 99.999%, a pressure of 0.5-0.55 MPa, and a flow rate of 40-50 m$^3$/h is injected for 30 minutes), stirring the first mixture to obtain an intermediate emulsion; then heating the intermediate emulsion to 75° C., then adding an initiator, keeping temperature and stirring for 8 hours to obtain a emulsion of polystyrene nanocomposite with a particle size of 40-90 nm; a mass ratio of the styrene to the initiator is 1:0.005;

The emulsion of polystyrene nanocomposite is successively subjected to ethanol demulsification, filtering, drying at 60° C. for 24 hours, granulating, and passing through a 200-mesh sieve to obtain polystyrene nanocomposite particles;

3) mixing industrial polyalphaolefin synthetic oil, the polystyrene nanocomposite particles and industrial oleic acid, and stirring evenly at room temperature to obtain a drilling fluid lubricant;

where a mass ratio of the industrial polyalphaolefin synthetic oil, the polystyrene nanocomposite particles and the industrial oleic acid is 1:0.001:0.05.

Hereinafter, drilling fluids are prepared using the drilling fluid lubricants in Examples 4-7. Before the preparation of the drilling fluids, the preparation of drilling fluid base slurry is completed by the following methods:

adding montmorillonite and anhydrous sodium carbonate to deionized water, stirring at 5000 rpm on a high-speed mixer for 30 minutes, and then left to stand for 24 hours under an airtight condition at room temperature, a drilling fluid base slurry with a soil content of 6% is obtained. Where a mass-volume ratio of the montmorillonite to the deionized water is 1:16.7, and a mass ratio of the anhydrous sodium carbonate to the montmorillonite is 1:20 (for example, 30.0 g of the montmorillonite and 1.5 g of the anhydrous sodium carbonate are added to per 500 ml of the deionized water).

Example 8

At room temperature, the drilling fluid lubricant prepared in Example 4 is added to the drilling fluid base slurry, and stirred at 5000 rpm for 5 minutes on the high-speed mixer to obtain a drilling fluid of this example. Where a mass fraction of the drilling fluid lubricant in the drilling fluid is 0.2%.

Example 9

A drilling fluid of this example is prepared according to the same method as in Example 8. The difference is that the mass fraction of the drilling fluid lubricant in the drilling fluid is 0.5%.

Example 10

A drilling fluid of this example is prepared according to the same method as in Example 8. The difference is that the mass fraction of the drilling fluid lubricant in the drilling fluid is 0.8%.

Example 11

A drilling fluid of this example is prepared according to the same method as in Example 8. The difference is that the mass fraction of the drilling fluid lubricant in the drilling fluid is 1.0%.

Example 12

A drilling fluid of this example is prepared according to the same method as in Example 8. The difference is that the mass fraction of the drilling fluid lubricant in the drilling fluid is 1.2%.

Example 13

At room temperature, the drilling fluid lubricant prepared in Example 5 is added to the drilling fluid base slurry, and stirred at 5000 rpm for 5 minutes on the high-speed mixer to obtain a drilling fluid of this example. Where a mass fraction of the drilling fluid lubricant in the drilling fluid is 0.2%.

Example 14

A drilling fluid of this example is prepared according to the same method as in Example 13. The difference is that the mass fraction of the drilling fluid lubricant in the drilling fluid is 0.5%.

Example 15

A drilling fluid of this example is prepared according to the same method as in Example 13. The difference is that the mass fraction of the drilling fluid lubricant in the drilling fluid is 0.8%.

Example 16

A drilling fluid of this example is prepared according to the same method as in Example 13. The difference is that the mass fraction of the drilling fluid lubricant in the drilling fluid is 1.0%.

Example 17

A drilling fluid of this example is prepared according to the same method as in Example 13. The difference is that the mass fraction of the drilling fluid lubricant in the drilling fluid is 1.2%.

Example 18

At room temperature, the drilling fluid lubricant prepared in Example 6 is added to the drilling fluid base slurry, and stirred at 5000 rpm for 5 minutes on the high-speed mixer to obtain a drilling fluid of this example. Where a mass fraction of the drilling fluid lubricant in the drilling fluid is 0.2%.

Example 19

A drilling fluid of this example is prepared according to the same method as in Example 18. The difference is that the mass fraction of the drilling fluid lubricant in the drilling fluid is 0.5%.

Example 20

A drilling fluid of this example is prepared according to the same method as in Example 18. The difference is that the mass fraction of the drilling fluid lubricant in the drilling fluid is 0.8%.

Example 21

A drilling fluid of this example is prepared according to the same method as in Example 18. The difference is that the mass fraction of the drilling fluid lubricant in the drilling fluid is 1.0%.

Example 22

A drilling fluid of this example is prepared according to the same method as in Example 18. The difference is that the mass fraction of the drilling fluid lubricant in the drilling fluid is 1.2%.

Example 23

At room temperature, the drilling fluid lubricant prepared in Example 7 is added to the drilling fluid base slurry, and stirred at 5000 rpm for 5 minutes on the high-speed mixer to obtain a drilling fluid of this example. Where a mass fraction of the drilling fluid lubricant in the drilling fluid is 0.2%.

Example 24

A drilling fluid of this example is prepared according to the same method as in Example 23. The difference is that the mass fraction of the drilling fluid lubricant in the drilling fluid is 0.5%.

Example 25

A drilling fluid of this example is prepared according to the same method as in Example 23. The difference is that the mass fraction of the drilling fluid lubricant in the drilling fluid is 0.8%.

Example 26

A drilling fluid of this example is prepared according to the same method as in Example 23. The difference is that the mass fraction of the drilling fluid lubricant in the drilling fluid is 1.0%.

Example 27

A drilling fluid of this example is prepared according to the same method as in Example 23. The difference is that the mass fraction of the drilling fluid lubricant in the drilling fluid is 1.2%.

In the following, performance tests are performed on the drilling fluids of Examples 8-27, and the specific test method is specifically referred to Q/SY 1088-2012.

1. Lubrication Performance Test

The drilling fluids of Examples 8-27 are taken, and their lubrication coefficients are tested on an extreme pressure lubricator. A lubrication coefficient reduction rate is calculated as follows:

$$R=(K0-K1)/K0*100\% \quad (1)$$

In the formula: R represents the lubrication coefficient reduction rate; K0 represents lubrication coefficient of the base slurry; K1 represents lubrication coefficient of the base slurry after the lubricant is added.

The test results are shown in Table 1.

TABLE 1

| Example | lubrication coefficient reduction rate (R, %) |
| --- | --- |
| 8 | 62.2 |
| 9 | 72.0 |
| 10 | 85.5 |
| 11 | 89.3 |
| 12 | 89.6 |
| 13 | 65.3 |
| 14 | 76.5 |
| 15 | 88.4 |
| 16 | 91.0 |
| 17 | 91.6 |
| 18 | 63.3 |
| 19 | 74.5 |
| 20 | 86.3 |
| 21 | 90.6 |
| 22 | 90.4 |
| 23 | 62.7 |
| 24 | 75.4 |

TABLE 1-continued

| Example | lubrication coefficient reduction rate (R, %) |
|---|---|
| 25 | 87.8 |
| 26 | 89.6 |
| 27 | 90.2 |

It can be seen from Table 1 that with the increase of the amount of the drilling fluid lubricant, lubrication performance of the drilling fluid is significantly improved, and the lubrication coefficient reduction rate is gradually increased, which indicates that the addition of the drilling fluid lubricant of the present disclosure can significantly improve lubrication performance of the drilling fluid and play a good role in reducing friction coefficient and improving effect of lubrication and drag reduction.

2. Rheological Performance Test

The drilling fluids of Examples 8-27 are taken and poured into a measuring cup of a six-speed viscometer so that the liquid level is flush with a scale line outside the viscometer. A rotation speed of the viscometer is set at 600, 300, 200, 100, 6 and 3 rpm, and the measurement is carried out quickly from high speed to low speed. After a dial is stabilized, the readings at $\theta_{600}$, $\theta_{300}$, $\theta_{200}$, $\theta_{100}$, $\theta_6$, $\theta_3$ are recorded, respectively.

After the above test is completed, the drilling fluid in the measuring cup is stirred at a speed of 600 r/min for 10 seconds, and after standing for 10 seconds, the measurement starts at 3 rpm, and a maximum value θ3-1 of the dial is read. After re-stirring, let it stand for 10 minutes, measure at 3 rpm, and read a maximum value θ3-2 of the dial.

The value of each rheological parameter is calculated by the following formula:

Apparent Viscosity:

$$AV=0.5*\theta_{600} \qquad (2)$$

Plastic Viscosity:

$$PV=\theta_{600}-\theta_{300} \qquad (3)$$

Dynamic Shear Force:

$$YP=0.511*(\theta_{300}-PV) \qquad (4)$$

Static Shear Force:

$$G10''=0.511*\theta_{3-1} \text{ (standing for 10 s)} \qquad (5)$$

$$G10''=0.511*\theta_{3-2} \text{ (standing for 10 min)} \qquad (6)$$

The test results are shown in Table 2.

TABLE 2

| Example | Apparent Viscosity (mPa·s) | Plastic Viscosity (mPa·s) | Dynamic Shear Force (Pa) | Static Shear Force (Pa/Pa) |
|---|---|---|---|---|
| 8 | 13.5 | 12.0 | 6.6 | 5.1/16.4 |
| 9 | 14.0 | 12.0 | 6.6 | 5.6/16.4 |
| 10 | 14.0 | 12.0 | 7.1 | 5.1/16.4 |
| 11 | 14.0 | 12.0 | 7.1 | 5.6/16.4 |
| 12 | 13.5 | 12.0 | 6.6 | 5.6/16.4 |
| 13 | 14.0 | 12.0 | 7.1 | 5.6/16.4 |
| 14 | 13.5 | 12.0 | 7.1 | 6.1/17.4 |
| 15 | 14.0 | 13.0 | 6.6 | 6.1/17.4 |
| 16 | 14.0 | 12.0 | 6.6 | 6.6/17.4 |
| 17 | 14.0 | 12.0 | 7.1 | 6.6/17.4 |
| 18 | 13.5 | 12.0 | 6.6 | 5.6/16.9 |
| 19 | 14.0 | 12.0 | 6.6 | 5.1/16.9 |
| 20 | 14.0 | 12.0 | 7.1 | 5.1/16.4 |
| 21 | 14.0 | 13.0 | 6.1 | 5.1/16.4 |
| 22 | 14.0 | 12.0 | 7.1 | 5.1/16.9 |
| 23 | 14.0 | 12.0 | 7.1 | 5.1/16.4 |
| 24 | 14.0 | 13.0 | 7.7 | 5.1/16.4 |
| 25 | 14.0 | 12.0 | 7.1 | 5.6/16.4 |
| 26 | 14.0 | 13.0 | 6.1 | 5.1/16.4 |
| 27 | 13.5 | 11.0 | 7.7 | 5.1/15.8 |

It can be seen from Table 2 that with the addition of the drilling fluid lubricant, the rheological parameters of Apparent Viscosity (AV), Plastic Viscosity (PV), Dynamic Shear Force (YP) and Static Shear Force (G10"/G10') of the drilling fluid are basically unchanged, indicating that the lubricant has a good compatibility with the drilling fluid and will not have any adverse effect on the rheological parameters of the drilling fluid.

3. Filter Loss Performance Test

Taking the drilling fluids of Examples 8-27 respectively, and adding the drilling fluids to a fluid loss cup of a filter loss tester so that the liquid level is flush a scale in the fluid loss cup, placing a measuring cylinder directly under the fluid loss cup, manually pressurizing and observing the pressure gauge reading, make it stable at 0.69 MPa, then adjusting the pressure reducing valve, stopping when the pressure drops slightly, starting to record the time when the first drop of water outflow is seen, measuring the filtrate volume after 30 min of water loss, which is the Filter Loss.

The test results are shown in Table 3.

TABLE 3

| Example | Filter Loss (mL) |
|---|---|
| 8 | 6.4 |
| 9 | 6.0 |
| 10 | 5.8 |
| 11 | 5.5 |
| 12 | 4.9 |
| 13 | 6.3 |
| 14 | 5.8 |
| 15 | 5.6 |
| 16 | 5.3 |
| 17 | 4.9 |
| 18 | 5.9 |
| 19 | 5.6 |
| 20 | 5.2 |
| 21 | 4.6 |
| 22 | 4.4 |
| 23 | 6.1 |
| 24 | 5.7 |
| 25 | 5.3 |
| 26 | 4.8 |
| 27 | 4.7 |

It can be seen from Table 3 that the addition of the lubricant has a certain effect on reducing the Filter Loss of the drilling fluid, and with the increase of the amount of the drilling fluid lubricant, the Filter Loss changes less.

4. Heat Resistance Test

Taking the drilling fluid in Examples 11, 16, 21, and 26, and testing the performance changes of the drilling fluid after 16 h of hot rolling in a roller heating furnace at 120° C., 160° C., and 200° C., respectively.

The test results are shown in Table 4.

TABLE 4

| Temperature (° C.) | Example | Apparent Viscosity (mPa · s) | Plastic Viscosity (mPa · s) | Dynamic Shear Force (Pa) | Lubrication coefficient reduction rate (R, %) |
|---|---|---|---|---|---|
| 120 | 11 | 21.5 | 14 | 7.7 | 86.3 |
|  | 16 | 21.0 | 14 | 7.2 | 88.6 |
|  | 21 | 20.5 | 13 | 7.7 | 90.5 |
|  | 26 | 22.0 | 14 | 8.2 | 91.3 |
| 160 | 11 | 23.5 | 15 | 8.7 | 85.5 |
|  | 16 | 24.0 | 16 | 8.2 | 87.4 |
|  | 21 | 24.0 | 15 | 9.2 | 88.1 |
|  | 26 | 23.5 | 14 | 9.7 | 89.7 |
| 200 | 11 | 25.5 | 16 | 9.7 | 84.2 |
|  | 16 | 25.5 | 16 | 9.7 | 85.7 |
|  | 21 | 26.5 | 17 | 9.7 | 85.9 |
|  | 26 | 26.5 | 17 | 9.7 | 86.0 |

It can be seen from Table 4 that as the increase of a hot rolling temperature, the Apparent Viscosity, Plastic Viscosity and Dynamic Shear Force of the drilling fluid increase slightly, and the lubrication coefficient reduction rate decreases slightly, but the effect is not significant, and a high lubrication is still maintained, and the lubricated drilling fluid still has a high lubricating performance after 16 hours of hot rolling at 200° C., indicating that the lubricated drilling fluid has a temperature resistance of 200° C.

5. Foaming Performance Test

Taking 20 parts of the drilling fluid base slurry with a volume of 300 mL, and then adding the drilling fluid lubricants prepared in Examples 8 to 27 to the 20 parts of the drilling fluid base slurry, respectively, stirring at 5000 rpm for 30 minutes on a high-speed mixer, and quickly pouring the stirred mixtures into measuring cylinders respectively, reading the volume change of drilling fluid before and after high stirring, respectively.

The test results are shown in Table 5.

| Example | Volume before high stirring (mL) | Volume after high stirring (mL) |
|---|---|---|
| 8 | 300.0 | 301.8 |
| 9 | 300.0 | 302.7 |
| 10 | 300.0 | 303.5 |
| 11 | 300.0 | 302.2 |
| 12 | 300.0 | 303.4 |
| 13 | 300.0 | 302.5 |
| 14 | 300.0 | 303.2 |
| 15 | 300.0 | 302.7 |
| 16 | 300.0 | 301.5 |
| 17 | 300.0 | 301.9 |
| 18 | 300.0 | 302.7 |
| 19 | 300.0 | 303.0 |
| 20 | 300.0 | 303.8 |
| 21 | 300.0 | 303.6 |
| 22 | 300.0 | 304.0 |
| 23 | 300.0 | 403.8 |
| 24 | 300.0 | 303.6 |
| 25 | 300.0 | 304.1 |
| 26 | 300.0 | 304.3 |
| 27 | 300.0 | 304.8 |

It can be seen from Table 5 that the volumes of drilling fluid base slurry increase slightly before and after the addition of different mass fractions of the drilling fluid lubricants, but the foaming rate is very small, indicating that the addition of drilling fluid lubricants has almost no impact on the foam performance of the drilling fluid base slurry.

Comparative Examples 1-5

In the drilling fluid base slurry, the commercially available drilling fluid lubricants RH8501 lubricant, DG5A lubricant, DG5B lubricant, RT9501 lubricant and RH525 lubricant are added at a mass fraction of 1.0% of the drilling fluid base slurry, respectively, to obtain the drilling fluids of the comparative examples 1-5.

According to the same test methods as above, the Lubrication coefficient reduction rate and Filter Loss of the comparative examples 1-5 are tested, and the results are shown in Table 6.

TABLE 6

| Comparative Example | Lubrication coefficient reduction rate (R, %) | Filter Loss (mL) |
|---|---|---|
| 1 | 45.3 | 7.3 |
| 2 | 66.4 | 6.9 |
| 3 | 59.6 | 4.8 |
| 4 | 70.8 | 6.7 |
| 5 | 68.5 | 5.4 |

Comparing Table 6 with Table 1 and Table 3, it can be seen that compared with commercially available drilling fluid lubricants, the drilling fluid lubricant prepared by the present disclosure has a higher Lubrication coefficient reduction rate and a lower Fluid Loss, indicating that compared with other types of drilling fluid lubricants, the drilling fluid lubricant prepared by the present disclosure has better lubrication and drag reduction performance and lower Fluid Loss of drilling fluid performance.

Finally, it should be noted that the foregoing examples are merely intended for describing the technical solutions of the present disclosure other than limiting the present disclosure. Although the present disclosure is described in detail with reference to the foregoing examples, persons of ordinary skill in the art should understand that they may still make modifications to the technical solutions described in the foregoing examples or make equivalent substitutions to some or all the technical features thereof, and these amendments and substitutions do not make the essence of the corresponding technical solutions departs from the scope of the technical solutions of examples of the present disclosure.

What is claimed is:

1. A preparation method of a drilling fluid lubricant, characterized by comprising the following steps:
   1) mixing styrene and water, then adding a nano-inorganic intermediate, a crosslinking agent and an emulsifier and stirring to obtain a first mixture;
   wherein a mass ratio of the styrene to the water is 1:(4.5-6.5);
   a mass ratio of the styrene, the nano-inorganic intermediate, the crosslinking agent and the emulsifier is 1:(0.01-0.1):(0.04-0.06):(0.018-0.032);
   2) under an inert atmosphere, stirring the first mixture to obtain an intermediate emulsion; then heating the intermediate emulsion to 70-85° C., then adding an initiator, keeping temperature and stirring for 7-10 hours to obtain an emulsion of polystyrene nanocomposite with a particle size of 40-90 nm; a mass ratio of the styrene to the initiator is 1:(0.002-0.008);

the emulsion of polystyrene nanocomposite being sequentially subjected to a granulating treatment to obtain polystyrene nanocomposite particles;

3) mixing industrial base oil, polystyrene nanocomposite particles and industrial oleic acid, and stirring evenly at room temperature to obtain the drilling fluid lubricant; wherein a mass ratio of the industrial base oil, the polystyrene nanocomposite particles and the industrial oleic acid is 1:(0.005-0.025):(0.04-0.09).

2. The preparation method according to claim 1, wherein the nano-inorganic intermediate is prepared according to the following steps:

a) mixing layered silicate and the water to obtain a second mixture, adjusting pH of the second mixture to 1-2, then heating to 70-80° C. and stirring for 30-40 minutes to obtain an activated silicate intermediate; a mass ratio of the layered silicate to the water is 1:(15-25);

b) adding an intercalation agent to the activated silicate intermediate, and stirring to react for 10-12 h at 30-35 Hz to obtain an intercalation reaction system; a mass ratio of the activated silicate intermediate to the intercalation agent is 1:(0.025-0.5);

c) subjecting the intercalation reaction system to filtration, washing, drying and grinding, to obtain the nano-inorganic intermediate.

3. The preparation method according to claim 2, wherein in the step a), one or more of hydrochloric acid, sulfuric acid and nitric acid is used to adjust the pH of the second mixture to 1-2.

4. The preparation method according to claim 3, wherein the intercalation agent is selected from one or more of sodium dodecyl sulfonate, sodium dodecyl sulfate, sodium dodecylbenzene sulfonate, sodium hexadecyl sulfonate, sodium octadecyl sulfonate, sodium stearate, sodium palmitate, and sodium laurate.

5. The preparation method according to claim 1, wherein before the step 1), further comprises subjecting the styrene to a purification pretreatment, and the purification pretreatment comprises: rinsing the styrene using a sodium hydroxide aqueous solution with a mass fraction of 8%, then adjusting pH of the styrene to 7, and distilling under a reduced pressure, and a distillate is the styrene that has been subjected to the purification pretreatment.

6. The preparation method according to claim 1, wherein the industrial base oil is selected from one or more of industrial silicone oil, industrial white oil, industrial poly-alphaolefin synthetic oil and industrial paraffin oil.

7. The preparation method according to claim 4, wherein the layered silicate is selected from one or more montmorillonite, hydrotalcite, kaolin, attapulgite, sepiolite, wollastonite, chlorite and layered silicate.

8. A drilling fluid lubricant obtained according to the preparation method of claim 1.

9. A drilling fluid comprising the drilling fluid lubricant according to claim 8, wherein a mass fraction of the drilling fluid lubricant in the drilling fluid is 0.2-5%.

* * * * *